United States Patent [19]

Chatwin et al.

US005413839A

[11] Patent Number: 5,413,839

[45] Date of Patent: May 9, 1995

[54] TRANSFER FILM

[75] Inventors: Charles E. Chatwin, Horsham; Karen S. Walker, Maidenhead, both of United Kingdom

[73] Assignee: Thomas De La Rue & Company Limited, London, England

[21] Appl. No.: 961,713

[22] PCT Filed: Jul. 12, 1991

[86] PCT No.: PCT/GB91/01158

§ 371 Date: Jan. 12, 1993

§ 102(e) Date: Jan. 12, 1993

[30] Foreign Application Priority Data

Jul. 12, 1990 [GB] United Kingdom ................. 9015319
Jul. 31, 1990 [GB] United Kingdom ................. 9016821

[51] Int. Cl.[6] .............................................. B32B 3/00

[52] U.S. Cl. .................................... 428/195; 428/173; 428/200; 428/202; 428/204; 428/688; 428/914; 156/230; 156/247; 427/147

[58] Field of Search ............... 428/195, 173, 159, 913, 428/914, 202, 200, 204, 688; 235/61.12; 283/9; 156/234, 230, 247; 427/147

[56] References Cited

U.S. PATENT DOCUMENTS 3,410,712 11/1968 Winzer ............................... 428/173
3,545,380 12/1970 Comegys et al. ................... 101/369
3,802,724 4/1974 Gosnell ..................................... 283/9
3,812,328 5/1974 Tramposch ...................... 235/61.12
4,006,050 2/1977 Hurst et al. .......................... 156/234
4,217,380 8/1980 Medica et al. ....................... 427/287
4,360,558 11/1982 Miura et al. ........................ 428/159
4,456,639 6/1984 Drower et al. ........................ 428/13
4,482,598 11/1984 Ishii et al. .......................... 428/195
4,797,315 1/1989 Bahmer et al. ...................... 428/173
4,881,999 11/1989 Balmer et al. ...................... 428/173
5,215,809 6/1993 Hoso et al. .......................... 428/195
5,232,764 11/1994 Oshima .............................. 428/173

FOREIGN PATENT DOCUMENTS 0194042 9/1986 European Pat. Off. .

*Primary Examiner*—Patrick J. Ryan
*Assistant Examiner*—W. Krynski
*Attorney, Agent, or Firm*—Oliff & Berridge

[57] ABSTRACT

A transfer film for use, for example, with security documents includes a pattern defining layer having concavities defining an inverted relief pattern, and a retaining layer overlying and releasably filling the concavities of the pattern defining layer. The pattern defining layer is removable from the retaining layer to transfer the relief pattern from the pattern defining layer to the retaining layer.

60 Claims, 4 Drawing Sheets

TRANSFER FILM

BACKGROUND OF THE INVENTION

The invention relates to a transfer film for use, for example, with security documents.

Intaglio printing has been used for many years to provide security printing on documents. Such printing has been used to provide security patterns and the like on banknotes and in addition tactility.

More recently, plastics security documents such as credit cards have been developed onto which intaglio printing is not generally possible. These generally lack intaglio-like tactility properties.

In these cases, planar films bearing security indicia and patterns have been transferred using a hot stamping technique. These films are applied under elevated pressure and temperature to a surface in the form of an alphanumeric pattern, a crest, logo or the like. For example by transferring a metallised film, gold effect lettering can be created of a smooth nature.

Metallised foils can be embossed by stamping a coarse three dimensional pattern, using an engraved stamping face such as in EP-A-194042A but this does not provide intaglio tactility.

It is known to apply films by hot stamping in which there is a three dimensional pattern such as a holographic, optically diffracting relief pattern on an inner surface of the film. Such films have, after transfer, completely flat surfaces, exhibiting no surface roughness. The hot stamping process itself is likely to flatten any external relief which may previously have existed on that surface of the film which may be touched after its transfer.

Signature panels have been hitherto conveniently been applied to cards by screen printing and hot stamping methods. It is desired significantly to improve on the counterfeit resistance and forgery resistance of such panels. Paper panels are difficult to remove from cards but hot stamped coatings are even more difficult as they are thinner and have less internal strength.

The use of intaglio printing is well established as an anti-counterfeiting and anti-forgery measure but it has not been used before with hot stamp signature strips. Intaglio is however found on the relatively expensive paper panels, which can significantly increase the cost of a card.

U.S. Pat. No. 3,545,380 describes intaglio effects obtained on hot stamping signature panels but this is done by providing a discontinuous transfer according to the engraving in the stamping head. They omit portions of the panel. This is undesirable.

In accordance with a first aspect of the present invention a transfer film comprises a pattern defining layer having concavities defining an inverted relief pattern; and a retaining layer overlying and releasably filling the concavities of the pattern defining layer, the pattern defining layer being removable from the retaining layer to leave the parts of the retaining layer filling the concavities defining the relief pattern.

In accordance with a second aspect of the present invention, a transfer film comprises a pattern defining layer having concavities defining an inverted relief pattern, the concavities being releasably filled with a relief material; and a retaining layer overlying the concavities of the pattern defining layer so as to adhere to the relief material, the pattern defining layer being removable from the retaining layer and the relief material to leave the relief material defining the relief pattern on the retaining layer.

We have devised a new transfer film which can be applied using a flat, unembossed mandrel to a planar substrate using a hot stamping technique so that an intaglio-like pattern can be provided on the substrate.

The invention is particularly suitable for applying signature panels since a complete panel carrying a relief pattern can be laid down without using an engraved stamping head. A parallel surfaced hot stamping film is provided in which the pattern defining layer's surface has three dimensional characteristics. Thus, the present invention provides a transfer film which will allow the making of signature panels on plastic, financial transaction cards, by a hot stamping method, such signature panels exhibiting at least over part of their surface intaglio-like tactility.

Typically, a release layer will be provided in the concavities, such as smooth grooves, such as to maximize transfer of the relief material with the retaining layer.

The pattern defining layer could be made of a single plastic layer element but preferably an additional support layer is provided, the pattern defining layer comprising a well bonded embossable coating in which the concavities are formed, of typical thickness 125 microns.

The retaining layer may be secured to a substrate in use by means of an adhesive provided on the substrate but typically the film further comprises an adhesive such as a pressure sensitive or preferably heat sensitive adhesive on the retaining layer. This enables sections of the transfer film to be secured to the substrate as in conventional hot stamping techniques. The film is particularly suited for use with plastics substrates but could be used with other forms of smooth substrate.

Preferably, the retaining layer is somewhat porous and includes a section on which marks can be written, for example signatures. This aspect is particularly important since the invention, as mentioned above, is particularly suitable for providing signature panels on identification cards and the like. In some cases, the relief pattern can be provided at opposite ends of a signature panel leaving a central section free for the application of a signature. In other cases, a relatively weak intaglio or relief pattern could be provided throughout the signature panel to enable a signature to be written across the relief pattern.

Preferably, the pattern defining layer is planographically printed on its surface facing the retaining layer such that the printing will transfer onto the retaining layer. This enables security indicia and the like to be provided on the retaining layer, for example such indicia exhibiting rainbow inking effects. Printed security indicia may comprise alphanumeric characters, signs, symbols, logos, geometric designs and fine line tracings. They may incorporate color hue and density, and line patterns designed to foil reproduction by half-tone screen separation methods, and electrophotographic color copiers including pixel and line scanning photocopiers, half-tone proofing color scanners and the like.

For signature panel purposes the retaining layer will preferably have a faint background tint. The tints of the marking composition and the retaining layer may be selected to create metameric effects. If the intaglio effect is to be present on the signing area the color of the marking composition will normally be chosen so as to be faint so as not to obscure the signature formed in dense ink.

The retaining layer typically comprises a clay, titanium oxide, zinc oxide, calcium carbonate, barium sulphate, zirconium oxide or other white or mutely colored pigment composition in an aqueous dispersion with an emulsion polymer such as a vinyl emulsion polymer.

The relief material will typically formed by a marking composition such as a paste or fluid ink or other type of coating but could comprise part of the retaining layer.

In accordance with a third aspect of the present invention, a method of forming a transfer film comprises providing a pattern defining layer having concavities defining an inverted relief pattern; overlying and releasably filling the concavities of the pattern defining layer with a retaining layer, wherein the pattern defining layer is removable from the retaining layer to leave the parts of the retaining layer filling the concavities defining the relief pattern.

In accordance with a fourth aspect of the present invention, a method of forming a transfer film comprises providing a pattern defining layer having concavities defining an inverted relief pattern; releasably filling the concavities with a relief material; and covering the pattern defining layer with a retaining layer overlying the concavities so as to adhere to the relief composition wherein the pattern defining layer is removable from the retaining layer and the relief material to leave the relief material defining the relief pattern on the retaining layer.

In a typical example, a support layer (polyester, for example of 20 microns thickness) supporting an embossable layer is provided. This embossable layer will typically be polyethylene 100 to 150 microns thick. The surface of the layer needs to be releasable. Biaxially orientated polypropylene may also be used as a support.

The release characteristics may be chosen by selecting two materials which inherently will have sufficient clinging engagement for the manufacturing and application yet release after stamping. Release can be increased by providing a thin primer of, say, wax or silicone, or decreased by treating the surface with a corona discharge (which will have the effect of increasing the bonding of a highly releasing material such as polyethylene).

The surface could then be releasably printed but in practice is unlikely to be at this stage because if solvent based relief material inks are used the inks are likely to be dissolved.

Concavities such as smooth grooves are then embossed in the embossable layer to define a relief pattern. Polyvinylcholoride may be embossed at from 95 to 145 degrees C. Polyethylene may be embossed at around 60 degrees C. Polycarbonate may be embossed at 165 degrees and nylon 175 degrees C. Embossing at too low a temperature loses fine detail. Above, the plastic is too soft to hold detail. The depths of the grooves are likely to be about 50 to 120 microns. Different groove depths could be used. Embossing will generally be made by using a metallic cylinder carrying the relief pattern which extends continuously around the circumference of the cylinder. The relief pattern will generally be metallic to allow embossing at elevated temperatures.

Polyethylene is preferred for ease of embossing and release of the ink and clay coatings. It can be corona treated if necessary in-line to control the adhesion and wetting properties.

The embossed area may overlap or simply be adjacent to the printed area (if provided). The embossed pattern may be of an overall "wallpaper" style i.e. containing repetitively repeating areas of miniature printing, or possibly a continuous design of a complex line pattern. This embossing will normally be undertaken with a roller which avoids showing circumferential joins: the image will be seamless. The embossing may comprise lines within a design which runs parallel to the length of the reel of plastic being embossed.

The concavities are then filled with ink and any excess is scraped off with a doctor blade.

If the ink is a high solids ink such as a paste ink then this should be dried to encourage its setting. For example there may be a small proportion of volatile solvent which when removed makes the ink's viscosity increase.

An ultraviolet or conceivably an electron beam curable ink may be used. This can be set more quickly than conventional paste inks can be dried as fast drying of conventional inks on a non-porous surface is likely to be a problem. An example of a suitable UV curable ink is Sericol brand UV021 (white) ink.

With these high solids inks the concavities or grooves are substantially completely filled. It is however possible to use solvent based inks such as flexographic inks which have solids contents of less than 10% by weight. Here the wet inks would fill the voids but they would be immediately dried by solvent evaporation. The remaining dyes or pigments would then merely line the concavity, not fill it. These inks being solvent borne will dissolve easily if forgery is attempted; thus they will be fugitive. In this case the retaining layer would be applied from an aqueous rather than a solvent coating.

In some cases, instead of providing ink in the concavities the retaining layer would fill the voids completely.

Preferably a printing process is now performed. Rainbow printing, close register multiple color work and use of hidden fluorescent agents in inks are the preferred types of printing.

Next the retaining layer would be applied, say at a thickness of 25 microns, other than where the relief pattern was present where it would be thicker.

The retaining layer will be quite thin relative to the embossing depths. This coating may be applied by a roller coating method. A UV curable ink could be applied as the retaining layer as an alternative to a while pigmentary emulsion coating.

The use of a slightly porous surface, rather than a surface film forming is preferred for signature panel applications. The coating must not be so porous as to allow solvent from the adhesive coating to penetrate and attack fugitive inks present at the release layer. Preferably, a white pigmentary coating is deposited from an aqueous binder so as not prematurely to dissolve any previously printed fugitive inks. This coating will also typically contain a small quantity of a bleach indicating reagent such as a substituted guanidine as known in the art. It will then be dried with hot air.

Next an adhesive would be applied. For signature panels this will be a heat activatable adhesive of thickness typically about 1 micron.

A second offset printing could be used as could a second embossing with a different color ink, preferably on a different area of the strip, such as the opposite end of the strip.

The retaining layer is preferably adapted to receive a mark such as a signature but could also be electronically imageable. It should be noted that the use of the slightly porous or rough white pigmentary coating will also be useful in helping toner to key or ink jet inks to dry but film forming coatings would be better for thermally transferred dye images.

The transfer film can be used on PVC based financial transaction cards, service entitlement cards, identification cards, access cards, EFTPOS cards and the like.

In addition to the invention being used for signature panel applications the transfer films may be used to affix areas to other plastic substrates such as the plastic covers of pass books, licences and the like.

The transfer film may also be used to apply textured borders to documents including paper and plastic which have been suitably printed. These borders may be rolled on under heat and pressure, rather than stamped. In these cases pressure sensitive adhesive backings could be used, either coated or transferred on. The strips could be used as seals.

In the case of signature panels, the tactility imparted provides a useful defense against fraudulent alteration of overlying signatures (although the signatures will not always overlie). It also provides a useful degree of deterrence against counterfeiting and is likely to reveal such. It will also resist and show fraudulent alteration.

The preferred signature panel composition comprises an intaglio or relief pattern to one side of the panel, rainbow offset printing, and/or UV absorptive visible light fluorescing marking in the signing area, multiple color finely registered images, incorporating a fugitive ink. The retaining layer will comprise a white pigmentary coating deposited from an aqueous medium and having bleach indicating reagents. The support layer will be polyester coated with a polyethylene pattern defining layer. A heat activatable adhesive will be used.

In some cases a thin metallic coating could be imparted to the embossed layer before or after the application of the relief material especially after solvent borne inks.

The pattern defining layer, such as polyethylene, could be embossed holographically and metallised.

Marking compositions which may be used with the present invention include colored opaque inks (including black and white), translucent inks, solvent responsive (fugitive) inks, metallic inks, color metallic inks: ultraviolet, visible or infrared radiation responsive inks such as ultraviolet fluorescing inks, photochromic inks, anti-Stokes inks, optically variable inks, iridescent inks, sensor responsive inks such as magnetic inks and the like.

The inks may be high solids inks such as lithographic inks including ultraviolet curable and electron beam curable inks, or solvent based inks such as flexographic inks or gravure inks.

Some examples of transfer films and methods according to the invention will now be described with reference to the accompanying drawings, in which:

DETAILED DESCRIPTION OF PREFERRED EMBODIMENTS

Figure 1:
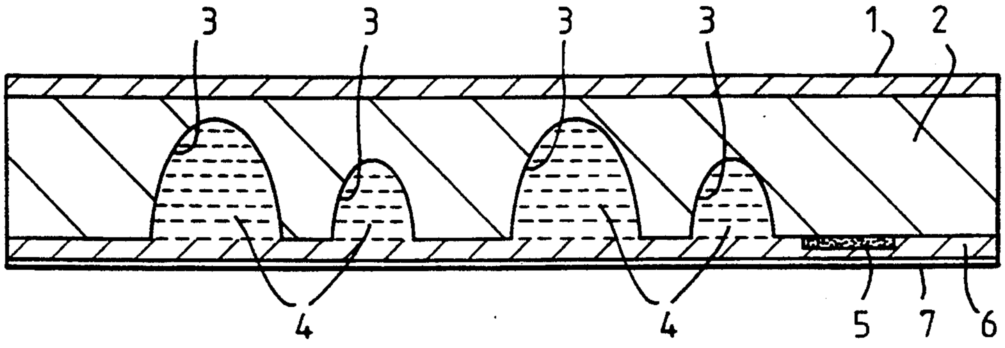
FIG. 1 is a cross-section through an example of a film.

A carrier layer or support film 1 (FIG. 1), such as biaxially orientated polyester, bears an embossable, releasable thermoplastic coating 2 (such as polyethylene). This releasable thermoplastic coating is embossed with a metal plate (not shown) which bears a relief pattern of lines so as to create indentations or concavities 3 in the plastic coating, typically of depth 100–125 microns.

The embossed film is then transferred to a coating or inking machine which allows a marking composition such as ink 4, preferably with a high solids content, to be deposited into the indentations or recesses 3. The coating process is such that excess ink is applied to the recessed film and then the surface is scraped with a doctor blade so as to leave ink only in the recesses. This ink is then dried to define a relief pattern. The coating 2 is then lithographically printed at 5 with security indicia, as previously described. A continuous retaining layer or coating 6 is then applied followed by a heat activatable adhesive layer 7 of for example 1 micron thickness.

The continuous layer 6 may be transparent or translucent or opaque and have a thickness of for example 5 microns. In order to make a signature strip panel the coating 6 would primarily be of white pigment e.g. titanium dioxide in a suitable aqueous binder such as a styrene-butadiene rubber or acrylic or other vinylic aqueous emulsion.

Figure 2:
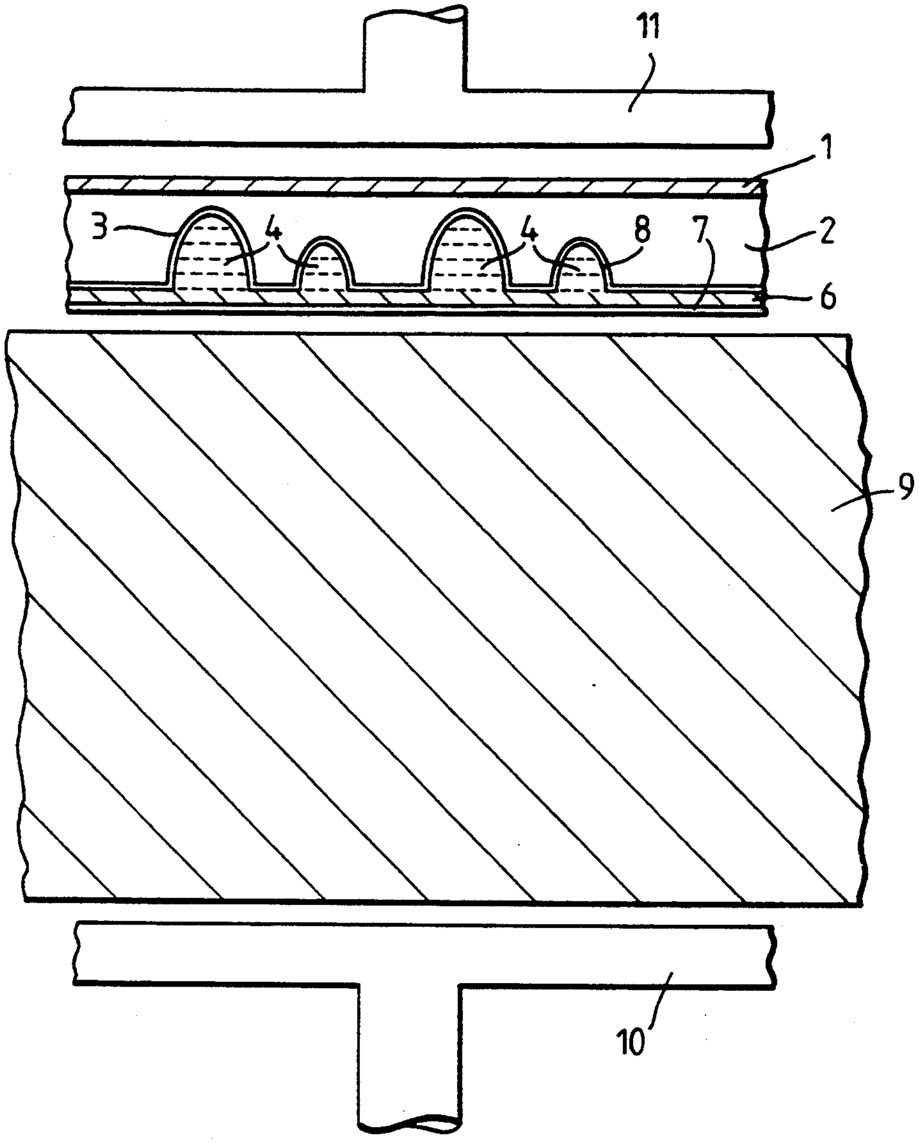
FIG. 2 is a cross-section through a second example of a transfer film positioned between the heads of a stamping machine.

FIG. 2 illustrates the manner in which the transfer film is used. In this case, a modified form of transfer film is shown in which an additional wax release layer 8 is provided within the concavities 3 as a lining and along the face of the coating 2 which abuts the retaining layer 6. The remainder of the transfer film shown in FIG. 2 is the same as that shown in FIG. 1 and similar reference numerals have been used. In this case, however, there is no printing 5 provided.

In use, the transfer film is stamped at a temperature of about 100° C. onto a suitable flat surface 9 against a mandrel 10 and flat faced stamping head 11, the area of which is suitable for transferring the intaglio-like line pattern.

Figure 3:
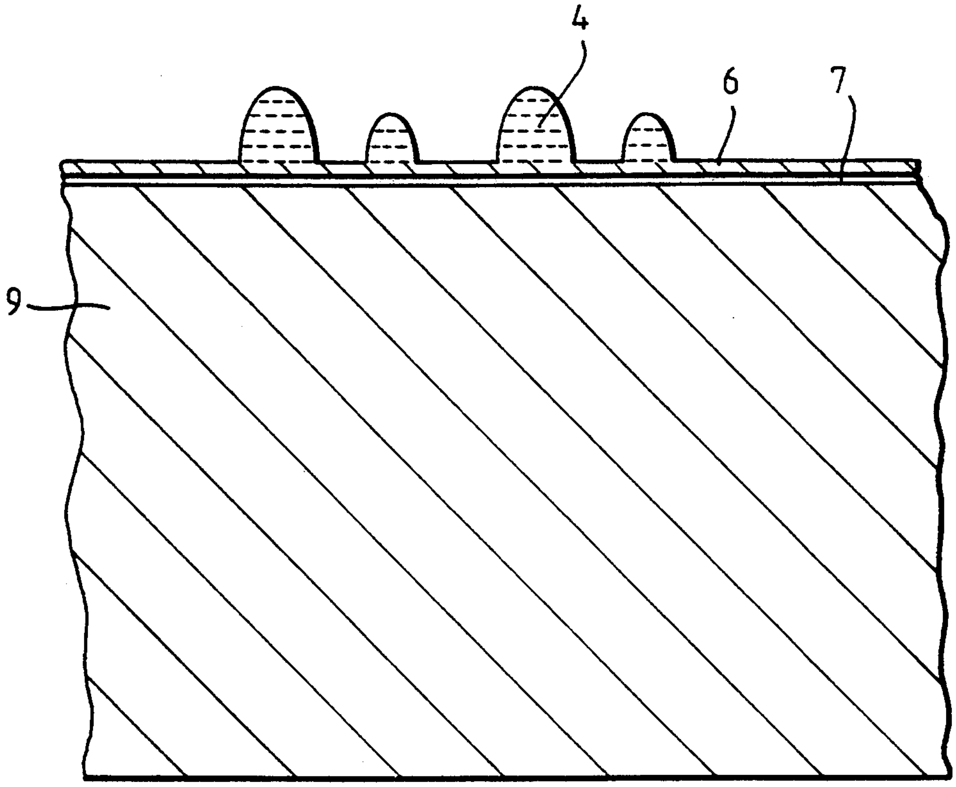
FIG. 3 is a cross-section through the film of FIG. 2 after transfer onto a substrate; and, FIGS. 4–9 are partial cross-sections through the transferred portions of further examples of transfer films.

By removing the carrier film and thermoplastic coating, a process which may be aided by the presence of wax or other release materials 8 if there is not already sufficient release between the ink 4 and layer 2, the signature strip surface is revealed, carrying a relief pattern (FIG. 3).

In FIG. 3 a cross section of the substrate 9 and the transferred coatings is shown.

The invention may be used for example to impart intaglio like texture to signature strip regions on plastic transaction or identification cards. In this case the intaglio simulation may be confined to the areas at the end of the signature strip to leave a suitable planar area for accepting the signature. In other cases, the intaglio simulation extends throughout the signature strip.

The shape of the grooves 3 must generally be concave so as to allow the forming and subsequent release of the intaglio pattern.

The coating material or ink used for making the intaglio pattern may be opaque, translucent or transparent.

It may contain coloring pigments, dyes including invisible ultraviolet radiation absorbing visible fluorescing dyes, photochromic dyes or pigments, reversible thermochromic materials, optically variable pigments and the like (as previously described).

For signature panel applications it is desirable to employ an ink which has fugitive properties, that is which causes a dye stain to spread when it is contacted with organic solvents.

If the release layer 2 is given one or more thin layers of metallic or dielectric coatings, then reflective metallic and complex color effects can be achieved. These coatings may be selectively removed by washing the film with, say, alkali after a resist pattern has been applied.

The surface 6 bearing the relief elements may be transparent and printed on its opposing side with security indicia.

While the invention has been described with reference to hot stamping films it is evident that pressure sensitive adhesive coatings and other heat activatable adhesive coatings may also be used. If the retaining layer is thermoplastic this can be directly bonded to a similar surface by lamination without the need for an adhesive layer.

As a further variation layer 6 may have the same hue as the relief coating; metameric effects may however be employed as a further security measure. (These are achieved by complementary printing of two coatings which have the same visible appearance but which absorb differently in the infrared. It provides a way of concealing messages).

Although the invention has been described with principal reference to signature strips carrying a white pigmentary coating, it is quite possible that the backing could have metallic or holographic/diffracting properties. The possibility that the intaglio effect strip say on a card could be further embossed to impart a transient/latent image or to take a relief name as on a credit card is also envisaged.

Figure 4:
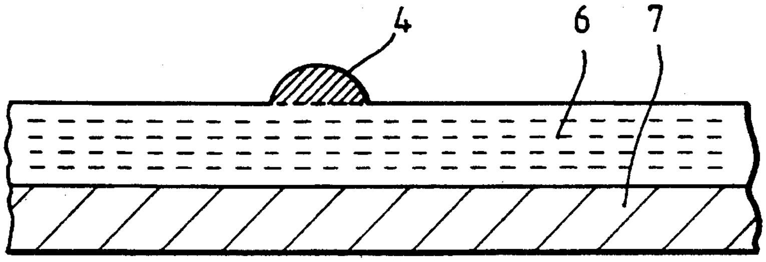

FIGS. 4–9 illustrate the appearance of the transferred portion of the transfer film resulting from different examples of transfer films. FIG. 4 illustrates the result of the process shown in FIG. 2. In this case, the retaining layer 6 carries a relief pattern formed simply by an ink region 4.

Figure 5:
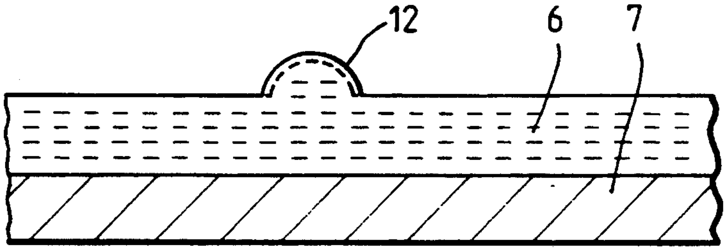

FIG. 5 illustrates the result of transferring from a transfer film in which the pattern defining layer 2 has been previously lined with a low solids (solvent) ink 12. It can be seen that this ink overlies a convex portion of the white pigmentary coating 6 which was previously forced into a corresponding concavity in the coating 2.

Figure 6:
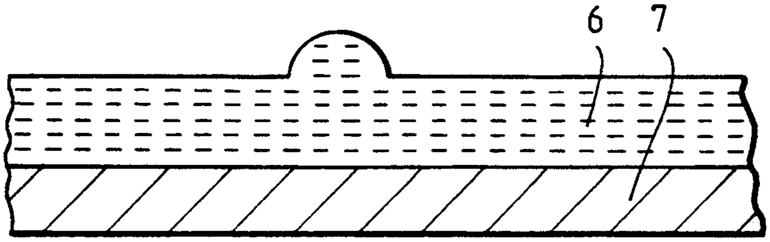

FIG. 6 illustrates a simpler version of the example shown in FIG. 5 in which no ink lining was provided and the white pigmentary layer 6 defines also the relief pattern.

Figure 7:
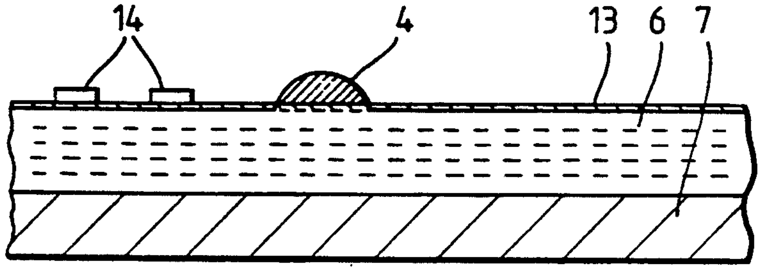

FIG. 7 illustrates a transferred film comprising an adhesive 7 and white pigmentary coating 6. The white pigmentary coating 6 carries a metallic film 13 which was provided following the concavity filling stage in which a high solids (paste) ink 4 was coated into the concavities 3. In this case, a security, dry or wet offset lithographic printing layer or print 14 was provided on the coating 2 prior to application of the metallic layer 13.

Figure 8:
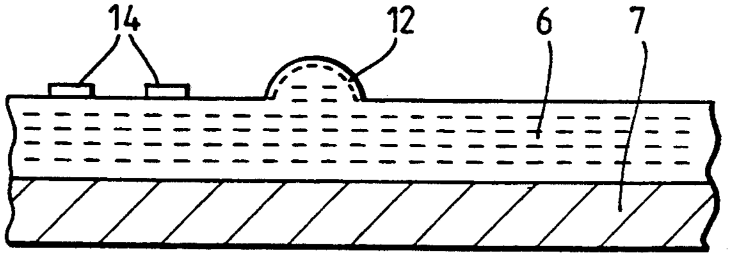

In the example shown in FIG. 8, a lithographic security coating 14 was provided in combination with a low solids ink lining 12 as in FIG. 5.

Figure 9:
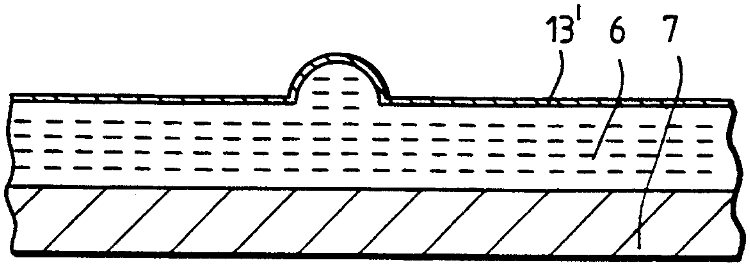

In the example shown in FIG. 9, a metallic lining 13' was provided on the coating 2 prior to application of the white pigmentary coating 6 which filled the concavity 3.

We claim:

1. A transfer film comprising a pattern defining layer having concavities defining an inverted relief pattern; and a retaining layer overlying and releasably filling the concavities of the pattern defining layer, the pattern defining layer being removable from the retaining layer to leave the parts of the retaining layer filling the concavities defining the relief pattern.

2. The film according to claim 1, wherein the retaining layer is colored.

3. The film according to claim 1, wherein the pattern defining layer comprises a carrier layer having a coating into which the concavities are embossed.

4. The film according to claim 1, further comprising an adhesive layer provided on the surface of the retaining layer facing away from the pattern defining layer.

5. The film according to claim 4, wherein the adhesive layer is a heat activatable adhesive.

6. The film according to claim 1, wherein the pattern defining layer is printed on its surface facing the retaining layer such that the printing will transfer on to the retaining layer.

7. The film according to claim 6, wherein the printing defines security indicia.

8. The film according to claim 1, further comprising a metallic layer releasably applied to the pattern defining layer for transfer with the retaining layer.

9. The film according to claim 1, wherein the retaining layer comprises a clay, titanium oxide, zinc oxide, calcium carbonate, barium sulphate or zirconium oxide composition in an aqueous dispersion with an emulsion polymer.

10. The film according to claim 1, further comprising a release layer in the concavities.

11. The film according to claim 10, wherein the release layer comprises a wax composition.

12. The film according to claim 1, wherein the retaining layer is adapted to receive a signature.

13. A method for making the transfer film according to claim 1, comprising providing a pattern defining layer having concavities defining an inverted relief pattern; releasably filling the concavities with a relief material; and covering the pattern defining layer with a retaining layer overlying the concavities so as to adhere to the relief material wherein the pattern defining layer is removable from the retaining layer and the relief material to leave the relief material defining the relief pattern on the retaining layer.

14. A film according to claim 1, wherein said concavities comprise a depth in the range of 50–120 microns.

15. A film according to claim 1, wherein said concavities comprise a depth in the range of 100–125 microns.

16. A method of forming a transfer film, the method comprising providing a pattern defining layer having concavities defining an inverted relief pattern; overlying and releasably filling the concavities of the pattern defining layer with a retaining layer wherein the pattern defining layer is removable from the retaining layer to leave the parts of the retaining layer filling the concavities defining the relief pattern.

17. The method according to claim 16, further comprising providing a release layer in the concavities prior to filling the concavities.

18. The method according to claim 16, wherein the pattern defining layer is provided on a support layer.

19. The method according to claim 16, wherein the pattern defining layer comprises polyethylene.

20. The method according to claim 16, wherein the pattern defining layer is corona treated on its surface facing the retaining layer so as to decrease the release properties of the surface.

21. The method according to claim 16, further comprising printing the pattern defining layer on its surface facing the retaining layer.

22. The method according to claim 21, wherein the printing is provided by dry or wet offset lithography.

23. The method according to claim 21, wherein the printing defines security indica such as, alphanumeric characters, signs, symbols, logos, geometric designs or fine line tracings.

24. The method according to claim 16, wherein the retaining layer is colored.

25. The method according to claim 16, wherein the retaining layer comprises a clay, titanium oxide, zinc oxide, calcium carbonate, barium sulphate, zirconium oxide or other white or mutely colored pigment composition in an aqueous dispersion with an emulsion polymer.

26. The method according to claim 16, wherein the retaining layer is adapted to receive a signature.

27. The method according to claim 16, further comprising the step of forming the concavities with a depth in the range of 50–120 microns.

28. The method according to claim 16, further comprising the step of forming the concavities with a depth in the range of 100–125 microns.

29. A transfer film comprising a pattern defining layer having concavities defining an inverted relief pattern, the concavities being releasably filled with a relief material; and a retaining layer overlying the concavities of the pattern defining layer so as to adhere to the relief material, the pattern defining layer being removable from the retaining layer and the relief material to leave the relief material defining the relief pattern on the retaining layer.

30. The film according to claim 29, wherein the relief material comprises an ink.

31. The film according to claim 29, wherein the retaining layer is colored.

32. The film according to claim 29, wherein the pattern defining layer comprises a carrier layer having a coating into which the concavities are embossed.

33. The film according to claim 2, further comprising an adhesive layer provided on the surface of the retaining layer facing away from the pattern defining layer.

34. The film according to claim 33, wherein the adhesive layer comprises a heat activatable adhesive.

35. The film according to claim 29, wherein the pattern defining layer is printed on its surface facing the retaining layer such that the printing will transfer on to the retaining layer.

36. The film according to claim 35, wherein the printing defines security indicia.

37. A film according to claim 29, further comprising a metallic layer formed on at least part of the retaining layer.

38. The film according to claim 29, wherein the retaining layer comprises a clay, titanium oxide, zinc oxide, calcium carbonate, barium sulphate or zirconium oxide composition in an aqueous dispersion with an emulsion polymer.

39. The film according to claim 29, further comprising a release layer in the concavities.

40. The film according to claim 39, wherein the release layer comprises a wax composition.

41. The film according to claim 29, wherein the retaining layer is adapted to receive a signature.

42. A film according to claim 29, wherein said concavities comprise a depth in the range of 50–120 microns.

43. A film according to claim 29, wherein said concavities comprise a depth in the range of 100–125 microns.

44. A method of forming a transfer film, the method comprising providing a pattern defining layer having concavities defining an inverted relief pattern; releasably filling the concavities with a relief material; and covering the pattern defining layer with a retaining layer overlying the concavities so as to adhere to the relief material wherein the pattern defining layer is removable from the retaining layer and the relief material to leave the relief material defining the relief pattern on the retaining layer.

45. The method according to claim 44, wherein the relief material comprises an ink.

46. The method according to claim 45, wherein the ink is selected from colored opaque inks, translucent inks, solvent responsive (fugitive) inks, metallic inks, colour metallic inks, ultraviolet, visible or infra-red radiation responsive inks, photochromic inks, anti-Stokes inks, optically variable inks, iridescent inks, and sensor responsive inks such as magnetic inks.

47. The method according to claim 44, further comprising providing a release layer in the concavities prior to filling the concavities.

48. The method according to claim 44, wherein the pattern defining layer comprises polyethylene.

49. The method according to claim 44, wherein the pattern defining layer is corona treated on its surface facing the retaining layer so as to decrease the release properties of the surface.

50. The method according to claim 44, further comprising printing the pattern defining layer on its surface facing the retaining layer.

51. The method according to claim 50, wherein the printing is provided by dry or wet offset lithography.

52. The method according to claim 50, wherein the printing defines security indicia.

53. The method according to claim 52, wherein said security indicia is selected from the group consisting of alphanumeric characters, signs, symbols, logos, geometric designs and fine line tracings.

54. The method according to claim 44, wherein the retaining layer is colored.

55. The method according to claim 44, wherein the retaining layer comprises a member selected from the group consisting of clay, titanium oxide, zinc oxide, calcium carbonate, barium sulphate and zirconium oxide.

56. The method according to claim 44, wherein the retaining layer comprises a white or mutely colored pigment composition in an aqueous dispersion with an emulsion polymer.

57. The method according to claim 44, wherein a signature panel is formed on the retaining layer.

58. A method according to claim 44, further comprising the step of forming the concavities with a depth in the range of 50–120 microns.

59. A method according to claim 44, further comprising the step of forming the concavities with a depth in the range of 100-125 microns.

60. A transfer film comprising a pattern defining layer having concavities defining an inverted relief pattern, and a retaining layer overlying and releasably filling the concavities of the pattern defining layer, wherein the pattern defining layer is removable from the retaining layer so as to transfer the relief pattern from the pattern defining layer to the retaining layer.

* * * * *